(12) United States Patent
Lee

(10) Patent No.: US 11,748,024 B2
(45) Date of Patent: Sep. 5, 2023

(54) APPARATUS AND METHOD OF MANAGING REGISTERS BASED ON REGISTER GROUP

(71) Applicant: Samsung Electronics Co., Ltd., Suwon-si (KR)

(72) Inventor: Sungrae Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 271 days.

(21) Appl. No.: 17/145,961

(22) Filed: Jan. 11, 2021

(65) Prior Publication Data

US 2021/0311657 A1 Oct. 7, 2021

(30) Foreign Application Priority Data

Apr. 1, 2020 (KR) .................. 10-2020-0039951
Jun. 5, 2020 (KR) .................. 10-2020-0068604

(51) Int. Cl.
*G06F 3/06* (2006.01)
*G06F 12/02* (2006.01)
*G06F 13/16* (2006.01)

(52) U.S. Cl.
CPC .......... *G06F 3/0655* (2013.01); *G06F 3/0604* (2013.01); *G06F 3/0679* (2013.01); *G06F 12/0284* (2013.01); *G06F 13/16* (2013.01)

(58) Field of Classification Search
CPC ...... G06F 9/30138; G06F 9/384; G06F 13/16; G06F 12/0284; G06F 9/30043; G06F 9/3004; G06F 9/30098
See application file for complete search history.

(56) References Cited

U.S. PATENT DOCUMENTS

| | | | |
|---|---|---|---|
| 6,330,661 B1 * | 12/2001 | Torii | G06F 9/3851 712/228 |
| 6,578,137 B2 | 6/2003 | Parady | |
| 7,584,346 B1 | 9/2009 | Chaudhry et al. | |
| 8,234,489 B2 | 7/2012 | Williamson et al. | |
| 8,719,827 B2 | 5/2014 | Kurata et al. | |
| 9,015,450 B2 | 4/2015 | Sun et al. | |
| 9,065,886 B2 | 6/2015 | Tkachov et al. | |
| 9,152,418 B2 | 10/2015 | Kim et al. | |
| 10,276,107 B2 | 4/2019 | Kurokawa | |
| 10,534,614 B2 | 1/2020 | Garbacea | |
| 2004/0236892 A1 * | 11/2004 | Zhu | G06F 13/404 710/306 |
| 2009/0222778 A1 * | 9/2009 | Goto | G06F 30/3323 716/106 |
| 2013/0262792 A1 * | 10/2013 | Barth, Jr. | G06F 1/3275 711/E12.001 |

(Continued)

FOREIGN PATENT DOCUMENTS

KR 100974751 B1 8/2010

*Primary Examiner* — Jane W Benner
(74) *Attorney, Agent, or Firm* — Harness, Dickey & Pierce, P.L.C.

(57) ABSTRACT

An apparatus includes a register block including a plurality of register groups; at least one processing circuit operating based on first data stored in the register block; and a register manager that receives second data from a host, receives a copy request for at least one register group from at least one processing circuit, and copies third data as at least a portion of the second data to at least one register group in response to the copy request.

20 Claims, 11 Drawing Sheets

(56) References Cited

U.S. PATENT DOCUMENTS

| | | | |
|---|---|---|---|
| 2013/0275700 A1* | 10/2013 | Wang | G06F 3/065 |
| | | | 711/162 |
| 2015/0287442 A1* | 10/2015 | Cho | G06F 12/0638 |
| | | | 711/109 |
| 2017/0083315 A1 | 3/2017 | Burger et al. | |
| 2017/0269856 A1* | 9/2017 | Ouyang | G06F 3/0619 |
| 2021/0092695 A1* | 3/2021 | Gattu | H04W 56/001 |

* cited by examiner

FIG. 12

```
                                                            ╱120
CC0_PDCCH_START_INDICATOR = 0x000
CC0_PDCCH_END_INDICATOR   = 0x100
CC0_PDSCH_START_INDICATOR = 0x104
CC0_PDSCH_END_INDICATOR   = 0x1FC
CC1_PDCCH_START_INDICATOR = 0x200
CC1_PDCCH_END_INDICATOR   = 0x300
CC1_PDSCH_START_INDICATOR = 0x304
CC1_PDSCH_END_INDICATOR   = 0x3FC
CC2_PDCCH_START_INDICATOR = 0x400
CC2_PDCCH_END_INDICATOR   = 0x500
CC2_PDSCH_START_INDICATOR = 0x504
CC2_PDSCH_END_INDICATOR   = 0x5FC
CC3_PDCCH_START_INDICATOR = 0x600
CC3_PDCCH_END_INDICATOR   = 0x700
CC3_PDSCH_START_INDICATOR = 0x704
CC3_PDSCH_END_INDICATOR   = 0x7FC
```

APPARATUS AND METHOD OF MANAGING REGISTERS BASED ON REGISTER GROUP

CROSS-REFERENCE TO RELATED APPLICATIONS

This application is based on and claims priority under 35 U.S.C. § 119 to Korean Patent Applications No. 10-2020-0039951, filed on Apr. 1, 2020 and No. 10-2020-0068604, filed on Jun. 5, 2020 in the Korean Intellectual Property Office, the disclosures of which are incorporated by reference herein in their entireties.

BACKGROUND

The inventive concepts relate to management of registers, and more particularly, to an apparatus and a method of managing registers based on a register group.

A signal processing apparatus may include various processing circuits. For example, the signal processing apparatus may include a core that executes a series of instructions stored in a memory, a logic circuit designed to perform a specific operation at high speed, or a circuit for processing analog and/or mixed signals. As increased throughput and/or processing speed are required, the type and number of processing circuits included in the signal processing apparatus may increase, and data used to process signals may vary more frequently, for example, in applications such as wireless communication and autonomous driving. Accordingly, it may be advantageous to more accurately control the processing circuits such that desired functions are performed in the signal processing apparatus.

SUMMARY

The inventive concepts provide an apparatus and a method of managing registers to accurately and efficiently control processing circuits.

According to an aspect of the inventive concepts, there is provided an apparatus including: a register block including a plurality of register groups; at least one processing circuit operating based on first data stored in the register block; and a register manager that receives second data from a host, receives a copy request for at least one register group from at least one processing circuit, and copies third data as at least a portion of the second data to at least one register group in response to the copy request.

According to an aspect of the inventive concepts, there is provided an apparatus including: a memory; a register block including a plurality of register groups; at least one processing circuit operating based on first data stored in the register block; and a register manager that writes second data received from a host into the memory, wherein the register manager reads third data from the memory and copies the third data to at least one register group in response to a copy request received from at least one processing circuit.

According to an aspect of the inventive concepts, there is provided a method of managing a register block referenced by at least one processing circuit including: storing data received from a host in a memory; detecting at least one first group identifier from a copy request received from at least one processing circuit; reading data from the memory based on the at least one first group identifier; and copying the read data to a register group corresponding to the at least one first group identifier from among a plurality of register groups included in the register block.

BRIEF DESCRIPTION OF THE DRAWINGS

Embodiments of the inventive concepts will be more clearly understood from the following detailed description taken in conjunction with the accompanying drawings in which:

FIG. 12 illustrates an example of a header file according to example embodiments;

DETAILED DESCRIPTION OF EXAMPLE EMBODIMENTS

Figure 1:
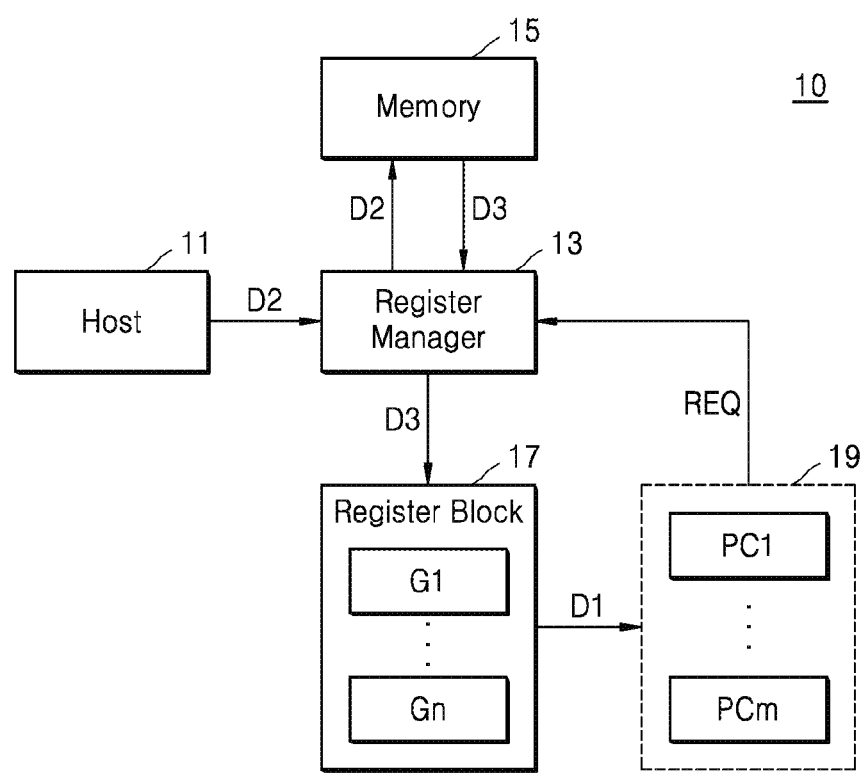
FIG. 1 is a block diagram of a signal processing apparatus according to example embodiments.

FIG. 1 is a block diagram of a signal processing apparatus 10 according to example embodiments. The signal processing apparatus 10 may refer to any device that processes a signal, and may be simply referred to herein as an apparatus. In some example embodiments, the signal processing apparatus 10 may be manufactured by a semiconductor process and may be included in one semiconductor package. In some example embodiments, components of the signal processing apparatus 10 may be included in two or more semiconductor packages mounted on a board, respectively, and may communicate with each other through patterns on the board. In some example embodiments, each of the components of the signal processing apparatus 10 may process a digital signal and may include at least one core configured to execute a series of instructions and/or a logic circuit designed by logic synthesis. As shown in FIG. 1, the signal processing apparatus 10 may include a host 11, a register manager 13, a memory 15, a register block 17, and/or a plurality of processing circuits 19.

Referring to FIG. 1, the plurality of processing circuits 19 may include first to $m^{th}$ processing circuits PC1 to PCm (m is an integer greater than 1). Each of the first to $m^{th}$ processing circuits PC1 to PCm may refer to any circuit designed to perform a specific function, such as signal (or data) processing in a desired manner. For example, each of the first to $m^{th}$ processing circuits PC1 to PCm may include a memory or a core that executes a series of instructions stored in the memory, a logic circuit designed to process specific operations at high speed, or a circuit for processing analog and/or mixed signals. Herein, a processing circuit may be referred to as a processing block, a sub-block, or the like. In some example embodiments, the plurality of processing circuits 19 may be connected to a bus such as an advanced extensible interface (AXI), an advanced peripheral bus (APB), etc. as a non-limiting example, and may generate output data by processing input data received through a bus and may transmit the output data through the bus.

The plurality of processing circuits 19 may access the register block 17 and may operate based on first data D1 stored in the register block 17. For example, the first data D1 may include parameters used by the plurality of processing circuits 19 to process a signal, and the plurality of processing circuits 19 may process a signal based on the parameters included in the first data D1. In addition, the first data D1 may include input data processed by the plurality of processing circuits 19, and the plurality of processing circuits 19 may process input data included in the first data D1.

The register block 17 may include a plurality of register groups, that is, first to $n^{th}$ register groups G1 to Gn (n is an integer greater than 1), and each of the first to $n^{th}$ register groups G1 to Gn may include at least one register. As will be described later below, the plurality of registers included in the register block 17 may be classified into the first to $n^{th}$ register groups G1 to Gn based on various factors. The first to $n^{th}$ register groups G1 to Gn may be managed independently from each other by the register manager 13, and in some example embodiments, the first to $n^{th}$ register groups G1 to Gn may be respectively accessed by the first to $m^{th}$ processing circuits PC1 to PCm. The register block 17 may have any structure accessed by the register manager 13 and the plurality of processing circuits 19. For example, the register block 17 may be designed by a hardware description file, as will be described later with reference to FIG. 10. Herein, the register block 17 may be referred to as a register file, a set of registers, or simply referred to as a plurality of registers.

In some example embodiments, the plurality of registers included in the register block 17 may be classified into the first to $n^{th}$ register groups G1 to Gn based on timing at which values stored in the plurality of registers are updated. For example, as will be described later with reference to FIG. 3, when the signal processing apparatus 10 is used for signal processing for wireless communication, various parameters (or communication parameters) may be used due to various scenarios defined by radio access technology (RAT) and a plurality of paths (e.g., 132 and 134 in FIG. 13) providing signals to the signal processing apparatus 10, and timings at which parameters are updated may vary rapidly. Accordingly, registers corresponding to parameters updated at the same timing may be grouped into one group.

In some example embodiments, the plurality of registers included in the register block 17 may be classified into the first to $n^{th}$ register groups G1 to Gn based on a processing circuit referencing values stored in the plurality of registers. For example, registers accessed by the first processing circuit PC1 may be classified into the first register group G1, and registers accessed by the $m^{th}$ processing circuit PCm may be classified into the $n^{th}$ register group Gn. Accordingly, a processing circuit may obtain the first data D1 independently of the operation of another processing circuit.

The host 11 may control operations of the plurality of processing circuits 19 by providing data to be stored in the register block 17. For example, as shown in FIG. 1, the host 11 may provide second data D2 to the register manager 13, and the second data D2 may be stored in the register block 17 via the memory 15 by the register manager 13. In some example embodiments, the host 11 and the register manager 13 may be connected to a bus, and the host 11 may provide the second data D2 to the register manager 13 through the bus. In some example embodiments, the host 11 may include at least one core that executes a series of instructions, and may include a central processing unit (CPU), a graphics processing unit (GPU), or a digital signal processor (DSP) as a non-limiting example. In some example embodiments, as will be described later with reference to FIG. 3, when the signal processing apparatus 10 is included in a communication processor (or modem), the host 11 may be a CPU that controls overall operations of the communication processor. In addition, the plurality of processing circuits 19 may perform individual operations of processing a baseband signal.

The register manager 13 may receive the second data D2 from the host 11 and may copy third data D3 as at least a portion of the second data D2 to the register block 17. For example, as shown in FIG. 1, the register manager 13 may write the second data D2 provided from the host 11 to the memory 15 by accessing the memory 15, and may read the third data D3 from the memory 15 and write the third data D3 to the register block 17. Herein, the operation of the host 11 providing the second data D2 to the register manager 13 and the register manager 13 writing the second data D2 to the memory 15 may be referred to as a register setting operation.

While the second data D2 is provided by the host 11, that is, during the register setting, when the plurality of processing circuits 19 access the register block 17, operations performed by the plurality of processing circuits 19 may be different from operations requested by the host 11. To reduce or prevent this, the register manager 13 may store the second data D2 provided from the host 11 in the memory 15 and may read the third data D3 from the memory 15 in response to a copy request REQ provided from the plurality of processing circuits 19 and store the third data D3 in the register block 17. An operation of buffering data to be stored in the register block 17 in this way may be referred to as register shadowing or simply shadowing.

As the number of processing circuits 19 increases and the complexity of signal processing increases, the size of data stored in the register block 17 may increase, and the register block 17 may also have a larger size. As shown in FIG. 1, the signal processing apparatus 10 may include the memory 15 instead of a plurality of registers having the same structure as that of the register block 17 for register shadowing, and accordingly, may reduce or minimize an increase in resources (e.g., area or power) used for register shadowing despite an increase in the size of the register block 17. In addition, as described above, the plurality of registers included in the register block 17 may be classified into the first to $n^{th}$ register groups G1 to Gn, and the register manager 13 may independently manage the first to $n^{th}$ register groups G1 to Gn. For example, the plurality of processing circuits 19 may perform operations based on data stored in the register block 17, that is, the first data D1, and may perform operations based on updated first data D1 by generating the copy request REQ before starting the operations. The copy request REQ provided from the plurality of processing circuits 19 may include at least one group identifier indicating at least one of the first to $n^{th}$ register groups G1 to Gn, and the register manager 13 may copy the third data D3 to at least one of the first to $n^{th}$ register groups G1 to Gn based on the at least one group identifier. Accordingly, even if the timing at which the host 11 updates data used by the plurality of processing circuits 19 varies, register setting and copying for each register group may be independently completed.

The memory 15 may have any structure including memory cells accessed by an address provided by the register manager 13. For example, the memory 15 may include a volatile memory such as dynamic random access memory (DRAM) or static RAM (SRAM), or may include a nonvolatile memory such as flash memory, resistive RAM (RRAM), and magnetic RAM (MRAM).

Figure 2:
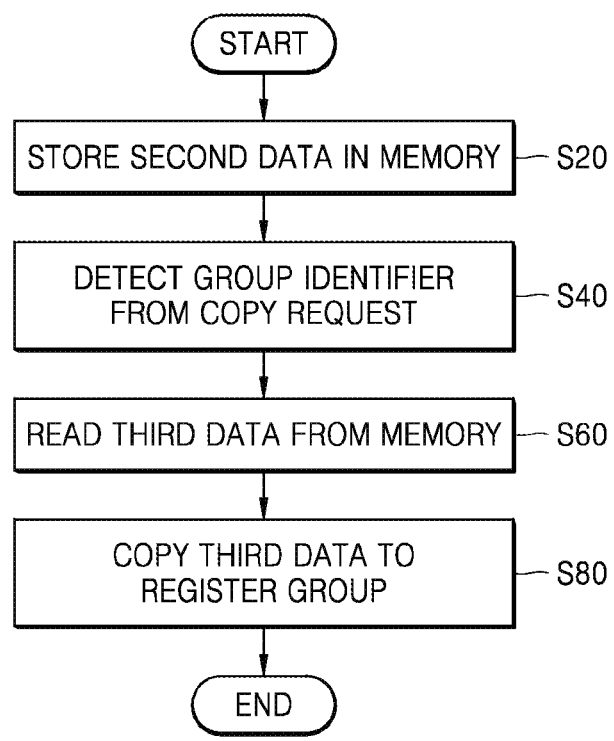
FIG. 2 is a flowchart illustrating an example of a method of managing registers, according to example embodiments.

FIG. 2 is a flowchart illustrating an example of a method of managing registers, according to example embodiments. As shown in FIG. 2, the method of managing registers may include a plurality of operations S20, S40, S60, and/or S80. In some example embodiments, the method of FIG. 2 may be performed by the register manager 13 of FIG. 1, and FIG. 2 will be described below with reference to FIG. 1.

Referring to FIG. 2, in operation S20, an operation of storing the second data D2 in the memory 15 may be performed. For example, the register manager 13 may receive the second data D2 from the host 11 and may write the second data D2 to the memory 15. An example of operation S20 will be described later with reference to FIG. 8.

In operation S40, an operation of detecting a group identifier from the copy request REQ may be performed. For example, the register manager 13 may receive the copy request REQ from the plurality of processing circuits 19 and detect at least one group identifier from the copy request REQ. In some example embodiments, the copy request REQ may be provided from one of the plurality of processing circuits 19, or may be provided from two or more of the plurality of processing circuits 19. When the copy request REQ is provided from two or more processing circuits, the register manager 13 may select one copy request based on a priority from among copy requests provided from two or more processing circuits, and may detect at least one group identifier from the selected copy request. Hereinafter, the copy request REQ will be described as being provided by the first processing circuit PC1, but it will be understood that example embodiments are not limited thereto.

In operation S60, an operation of reading the third data D3 from the memory 15 may be performed. For example, the register manager 13 may obtain an address corresponding to at least one group identifier detected in operation S40, and may read the third data D3 from the memory 15 based on the obtained address. An example of operation S60 will be described later with reference to FIG. 9.

In operation S80, an operation of copying the third data D3 to a register group may be performed. For example, the register manager 13 may write the third data D3 to at least one register group corresponding to the at least one group identifier detected in operation S40. Then, the plurality of processing circuits 19 may refer to at least a portion of the third data D3 stored in the register block 17.

Figure 3:
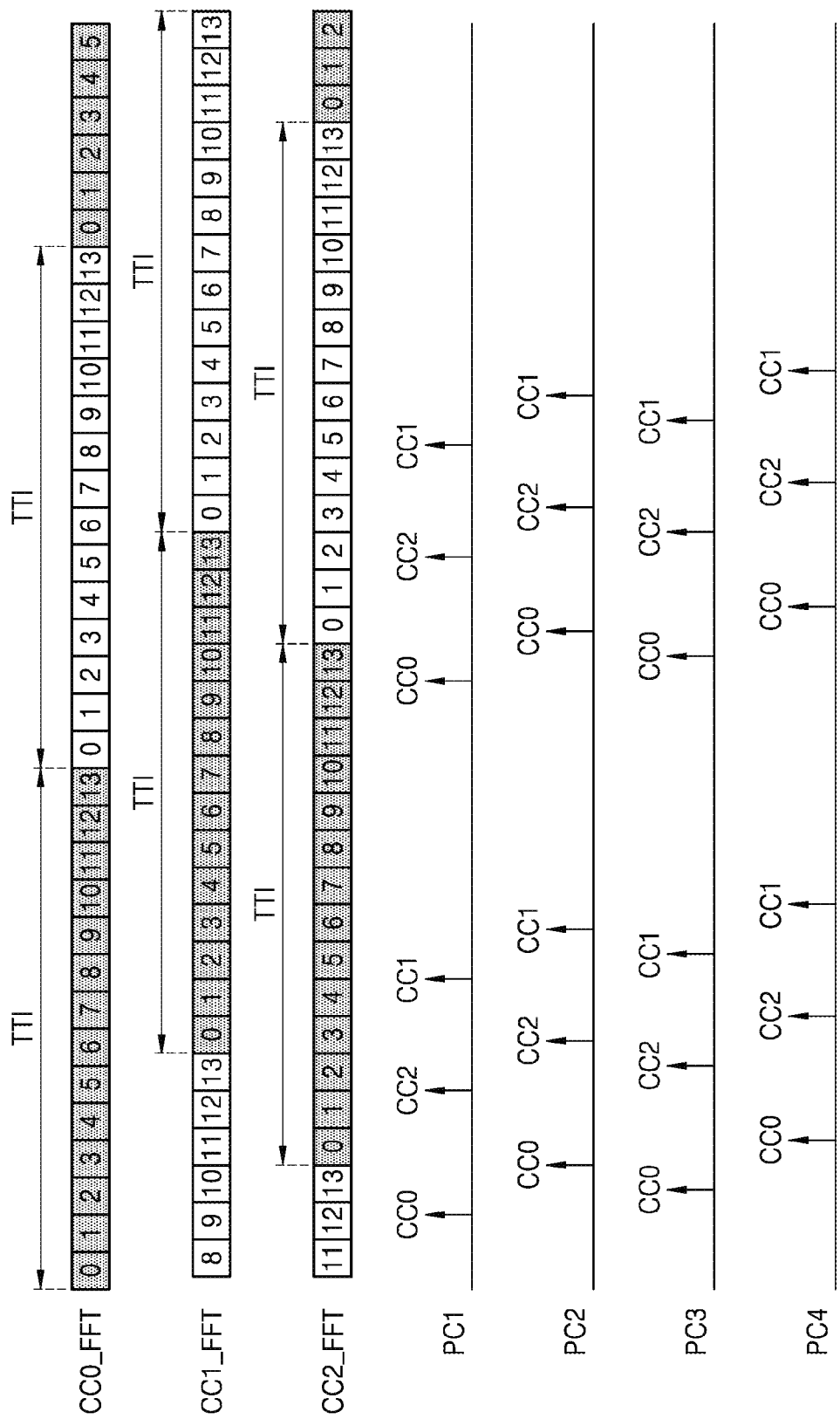
FIG. 3 is a timing diagram illustrating an example of an operation of a signal processing apparatus, according to example embodiments.

FIG. 3 is a timing diagram illustrating an example of an operation of a signal processing apparatus, according to example embodiments. In more detail, the timing diagram of FIG. 3 shows an example of an operation of a signal processing apparatus that processes a signal for wireless communication. In the example of FIG. 3, it is assumed that the plurality of processing circuits 19 of FIG. 1 include the first to fourth processing circuits PC1 to PC4, and FIG. 3 will be described below with reference to FIG. 1.

In some example embodiments, the signal processing apparatus 10 of FIG. 1 may be included in a communication processor (or a modem). For example, the signal processing apparatus 10 may process a baseband signal generated by processing a radio frequency (RF) signal received through an antenna, and may perform filtering, demodulation, decoding, or the like. Further, the signal processing apparatus 10 may process a baseband signal for generating an RF signal to be transmitted through an antenna, and may perform encoding, modulation, filtering, or the like.

As a non-limiting example, RAT such as a 5th generation wireless (5G) new radio (NR) system, a long term evolution (LTE) system, and an LTE-Advanced system may support carrier aggregation. Accordingly, as shown in FIG. 3, three input signals CC0_FFT, CC1_FFT, and CC2_FFT corresponding to three component carriers CC0, CC1, and CC2, respectively, may be provided to the first to fourth processing circuits PC1 to PC4. The three input signals CC0_FFT, CC1_FFT, and CC2_FFT may include a series of symbols, and may be processed by different parameters (or communication parameters) in a unit of transmission time interval (TTI) including 14 successive symbols. For example, New Radio (NR) defined by a 3rd generation partnership project (3GPP) may have a slot of 125 microsecond, and accordingly, the TTI may be shorter than 1 millisecond specified in LTE. In addition, each of the component carriers may have channels (e.g., a physical downlink control channel (PDCCH) or a physical downlink shared channel (PDSCH)), and accordingly, a number of parameters may be updated more frequently due to the shorter TTI. In addition, due to a plurality of paths formed between a transmitting antenna and a receiving antenna, a plurality of transceivers that provide baseband signals to the signal processing apparatus 10, and the like, timings of TTIs in the three input signals CC0_FFT, CC1_FFT, and CC2_FFT may be different as shown in FIG. 3, and the register manager 13 may receive the second data D2 from a host at a timing synchronized with the TTI of each of the three input signals CC0_FFT, CC1_FFT, and CC2_FFT.

The first to fourth processing circuits PC1 to PC4 may access the register block 17 at different timings. For example, the first and third processing circuits PC1 and PC3 may process signals received on a PDCCH based on different parameters. Further, the second and fourth processing circuits PC2 and PC4 may process signals received on a PDSCH based on different parameters. Accordingly, as indicated by arrows in FIG. 3, not only timings at which the first to fourth processing circuits PC1 to PC4 access the register block 17, that is, timings at which copy requests are generated, are different, but also registers accessed by the first to fourth processing circuits PC1 to PC4 may be different.

As described above with reference to FIGS. 1 and 2, the register block 17 may be divided into a plurality of register groups, that is, the first to $n^{th}$ register groups G1 to Gn, and the register manager 13 may independently manage the first to $n^{th}$ register groups G1 to Gn. Accordingly, despite various access timings for the register block 17, as shown in FIG. 3, register setting may be efficiently performed, and the first to fourth processing circuits PC1 to PC4 may be accurately controlled.

Figure 4:
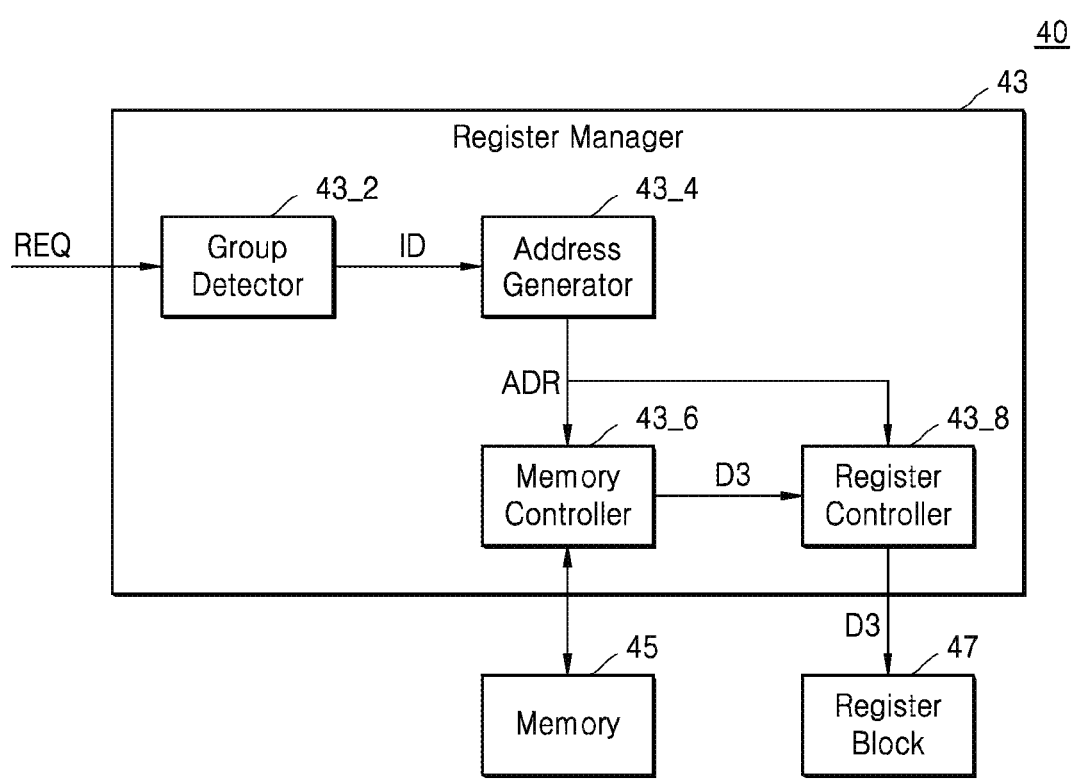
FIG. 4 is a block diagram of a signal processing apparatus according to example embodiments.

FIG. 4 is a block diagram of a signal processing apparatus 40 according to example embodiments. In more detail, the block diagram of FIG. 4 shows an example of a register manager 43 that operates in response to the copy request REQ, along with a memory 45 and a register block 47. As described above with reference to FIG. 1, the register manager 43 may receive a copy request REQ and copy the third data D3 to the register block 47. As shown in FIG. 4, the register manager 43 may include a group detector 43_2, an address generator 43_4, a memory controller 43_6, and/or a register controller 43_8. Hereinafter, a description of FIG. 4 that is the same or substantially the same as the description of FIG. 1 is omitted herein.

The group detector 43_2 may receive the copy request REQ and may detect at least one group identifier ID in the copy request REQ. For example, the first processing circuit PC1 of FIG. 1 may generate the copy request REQ including at least one group identifier (it may be referred to as at least one first group identifier herein) indicating at least one register group to be accessed. In some example embodiments, the first processing circuit PC1 may generate the copy request REQ including a plurality of bits, and the plurality of bits may have indexes corresponding to a plurality of register groups, respectively. The first processing circuit PC1 may activate a bit (e.g., set to '1') having an index corresponding to a register group requesting a copy and deactivate the remaining bits (e.g., set to '0'). The group detector 43_2 may detect at least one activated bit from among the plurality of bits included in the copy request REQ, and may determine at least one group identifier from an index of the detected at least one bit.

The address generator 43_4 may receive the group identifier ID from the group detector 43_2 and may generate an address ADR corresponding to the group identifier ID. For example, the address generator 43_4 may include a mapping table including an address of the memory 45 and a group identifier corresponding to each other as an entry, and may generate an address corresponding to the group identifier ID received from the group detector 43_2 by referring to the mapping table. As shown in FIG. 4, the address ADR may be provided to the memory controller 43_6 and the register controller 43_8.

The memory controller 43_6 may receive the address ADR from the address generator 43_4, and may read data stored in an area corresponding to the address ADR from the memory 45, that is, the third data D3. For example, the address generator 43_4 may sequentially generate the address ADR that increases from a start address to an end address of an area in which the third data D3 is stored, and the memory controller 43_6 may sequentially read the third data D3 from the memory 45. As shown in FIG. 4, the memory controller 43_6 may provide the third data D3 to the register controller 43_8.

The register controller 43_8 may receive the address ADR from the address generator 43_4 and may receive the third data D3 from the memory controller 43_6. The register controller 43_8 may write the third data D3 to the register block 47 based on an interface of the register block 47. For example, the register controller 43_8 may identify at least one of the plurality of register groups included in the register block 47 based on the address ADR provided from the address generator 43_4, and may write the third data D3 to the identified register group. In some example embodiments, different from that shown in FIG. 4, the register controller 43_8 may receive the group identifier ID from the group detector 43_2 instead of the address ADR. In some example embodiments, the register controller 43_8 and the register block 47 may communicate with each other according to a bus interface, such as an APB interface, and the register controller 43_8 may be referred to as a bus controller.

Figure 5:
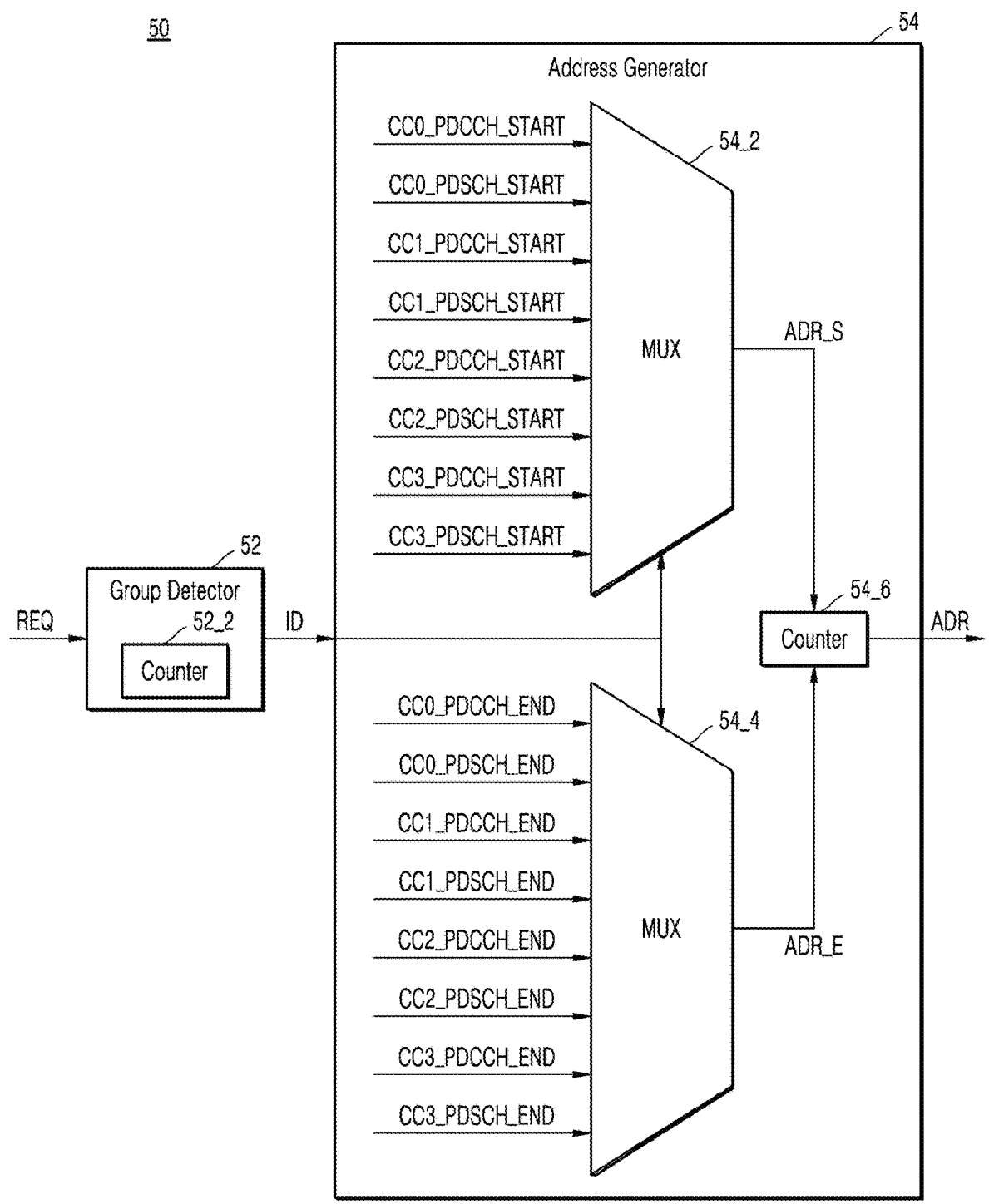
FIG. 5 is a block diagram illustrating an example of a register manager, according to example embodiments.

FIG. 5 is a block diagram showing an example of a register manager 50 according to example embodiments. In more detail, the block diagram of FIG. 5 shows a group detector 52 and an address generator 54 included in the register manager 50 to manage eight register groups. In some example embodiments, the group detector 52 and the address generator 54 of FIG. 5 may be defined by register transfer level (RTL) description, and may be implemented by logic synthesis and place and routing. As described above with reference to FIG. 4, the group detector 52 may provide the group identifier ID from the received copy request REQ to the address generator 54, and the address generator 54 may generate the address ADR from the group identifier ID. Hereinafter, a description of FIG. 5 that is the same or substantially the same as the description of FIG. 4 is omitted herein.

The group detector 52 may include a counter 52_2. For example, as described above with reference to FIG. 4, the copy request REQ may include a plurality of bits having indexes corresponding to a plurality of register groups, respectively. The group detector 52 may sequentially detect whether each of the plurality of bits is in an active state, for example, from a low index, and an output of the counter 52_2 may increase whenever the index increases. Accordingly, the output of the counter 52_2 may match an index of a bit. The group detector 52 may output an output of the counter 52_2 as the group identifier ID when an activated bit is detected. In the example of FIG. 5, the copy request REQ may include 8 bits corresponding to 8 register groups, and the group identifier ID may be a 3-bit or more multi-bit signal to indicate 8-bit indexes.

The address generator 54 may include a first multiplexer 54_2, a second multiplexer 54_4, and a counter 54_6. The first multiplexer 54_2 may receive start addresses of areas of a memory (e.g., 45 in FIG. 4) corresponding to register groups, respectively, and may output one of the start addresses as a start address ADR_S based on the group identifier ID. For example, as shown in FIG. 5, the first multiplexer 54_2 may provide one of eight start addresses including CC0_PDCCH_START to the counter 54_6 as the start address ADR_S based on the group identifier ID. Similarly, the second multiplexer 54_4 may receive end addresses of the areas of the memory corresponding to the register groups, respectively, and may output one of the end addresses as an end address ADR_E based on the group identifier ID. For example, as shown in FIG. 5, the second multiplexer 54_4 may provide one of eight end addresses including CC0_PDCCH_END to the counter 54_6 as the end address ADR_E based on the group identifier ID. The counter 54_6 may generate the address ADR for accessing an area of a memory defined by the start address ADR_S and the end address ADR_E. For example, the counter 54_6 may generate the address ADR sequentially increasing from the start address ADR_S to the end address ADR_E, and may generate the address ADR sequentially decreasing from the end address ADR_E to the start address ADR_S.

Figure 6:
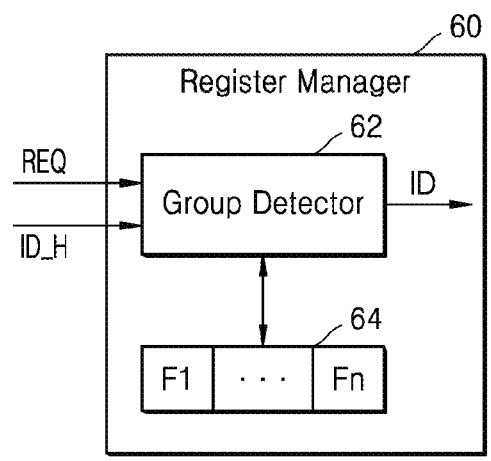
FIG. 6 is a block diagram illustrating an example of a register manager, according to example embodiments.

FIG. 6 is a block diagram illustrating an example of a register manager 60 according to example embodiments. In more detail, the block diagram of FIG. 6 shows the register manager 60 using a ready flag. As shown in FIG. 6, the register manager 60 may include a group detector 62 and a flag register 64.

The flag register 64 may include the same number of ready flags as the number of register groups, that is, first to $n^{th}$ ready flags F1 to Fn (n is an integer greater than 1). In some example embodiments, each of the first to $n^{th}$ ready flags F1 to Fn may correspond to 1 bit, and the flag register 64 may be implemented as an n-bit register.

The register manager 60 may receive the copy request REQ from a register block, and may receive at least one group identifier ID_H (it may be referred to as at least one second group identifier herein) as well as the second data D2 from a host (e.g., 110 in FIG. 1). The at least one group identifier ID_H may indicate at least one register group corresponding to the second data D2. The group detector 62 may generate a group identifier ID from at least one group identifier ID_H, and accordingly, the second data D2 may be written to a desired area of a memory (e.g., 15 in FIG. 1). As described above with reference to FIG. 3, in an environment where a plurality of parameters are frequently updated and timings at which the parameters are updated are various ones, the copy request REQ may be received while performing register setting.

After the second data D2 is written to the memory, the group detector 62 may activate a ready flag corresponding to the at least one group identifier ID_H, that is, at least one second group identifier, while deactivating a ready flag corresponding to at least one group identifier detected from the copy request REQ, that is, at least one first group identifier. In addition, when the ready flag corresponding to the first group identifier is in an inactive state, the group detector 62 may not generate the group identifier ID such that the third data D3 is not copied. Accordingly, copying of the third data D3 may be reduced or prevented during the register setting, and an example of the operation of the register manager 60 using the flag register 64 will be described later with reference to FIG. 7.

Figure 7:
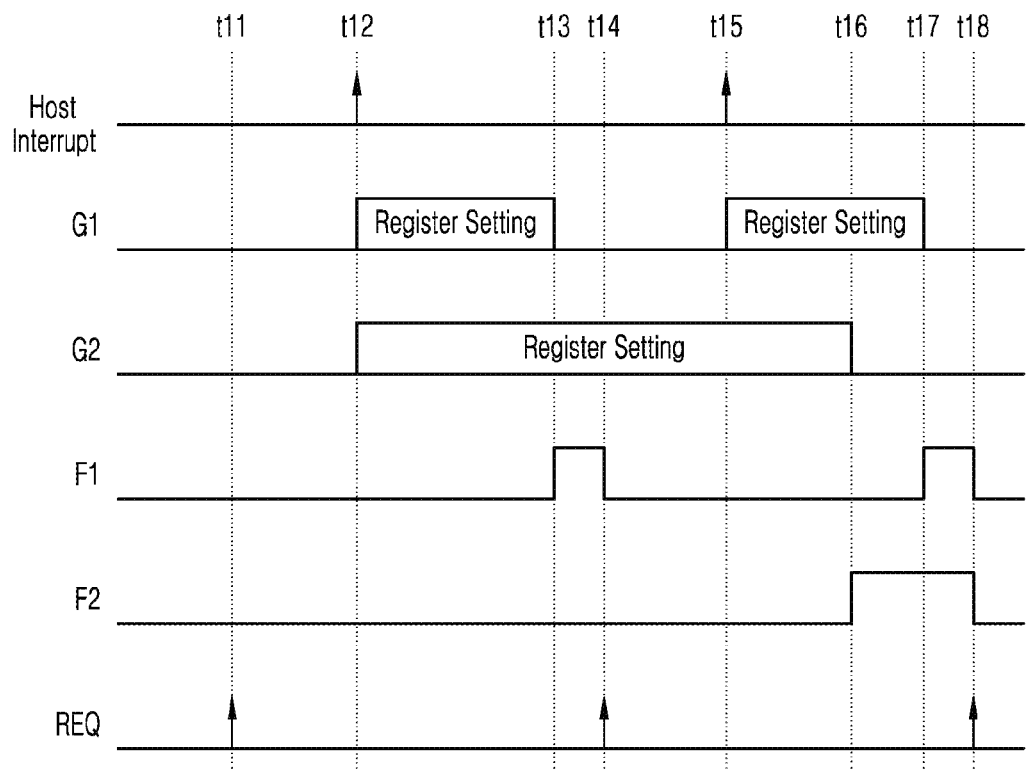
FIG. 7 is a timing diagram illustrating an example of an operation of a signal processing apparatus, according to example embodiments.

FIG. 7 is a timing diagram illustrating an example of an operation of a signal processing apparatus, according to example embodiments. In the example of FIG. 7, it is assumed that a register block includes two register groups, that is, first and second register groups G1 and G2, and a flag register also includes two ready flags, that is, first and second ready flags F1 and F2. In some example embodiments, the operation of FIG. 7 may be performed by the signal processing apparatus including the register manager 60 of FIG. 6, and FIG. 7 will be described below with reference to FIG. 6.

At time t11, the copy request REQ may occur. For example, the register manager 60 may receive the copy request REQ from at least one of a plurality of processing circuits. Because the first and second ready flags F1 and F2 included in the flag register 64 are in an inactive state, the register manager 60 may not perform copying of the third data D3.

At time t12, a host interrupt may occur. For example, as described above with reference to FIG. 3, a fast fourier Transform (FFT) block may cause an interrupt in a host by detecting a slot, and a host (e.g., 11 in FIG. 1) may perform register setting in response to the interrupt. The host may start providing the second data D2 to the register manager 60 to set the first register group G1 and the second register group G2, and the register manager 60 may start writing the second data D2 to a memory (e.g., 15 in FIG. 1).

The time required to set up registers may vary depending on the register group. For example, communication parameters may include parameters that are variable per slot as well as parameters that remain constant in successive slots. For example, communication parameters based on channel measurement and communication parameters provided through radio resource control (RRC) signaling may be kept constant in successive slots. In addition, communication parameters that change for each slot may need to be updated with a relatively high priority, and accordingly, update of communication parameters corresponding to a relatively low priority may be delayed. In addition, as the number of communication parameters corresponding to the register group increases, the time required for register setting may increase. The registers may be grouped according to an update period of parameters, and accordingly, as shown in FIG. 7, the setting of the second register group G2 may be completed later than the setting of the first register group G1.

At time t13, the setting of the first register group G1 may be completed. For example, the register manager 13 may complete an operation of writing data corresponding to the first register group G1 among the second data D2 to the memory. Accordingly, the group detector 62 may activate the first ready flag F1.

At time t14, the copy request REQ may occur. Because the first ready flag F1 is in an active state, the third data D3 may be copied to the first register group G1, and the group detector 62 may deactivate the first ready flag F1. Further, because the second ready flag F2 is still in an inactive state, the register manager 60 may not perform copying of the third data D3 for the second register group G2.

At time t15, a host interrupt may occur, and the setting of the first register group G1 corresponding to communication parameters updated for each slot may be started. Accordingly, the second data D2 including data for setting the first register group G1 may be provided.

At time t16, the setting of the second register group G2 may be completed. For example, the register manager 13 may complete an operation of writing data corresponding to the second register group G2 among the second data D2 to the memory. Accordingly, the group detector 62 may activate the second ready flag F2.

At time t17, the setting of the first register group G1 may be completed. For example, the register manager 13 may complete an operation of writing data corresponding to the first register group G1 among the second data D2 to the memory. Accordingly, the group detector 62 may activate the first ready flag F1.

At time t18, the copy request REQ may occur. Unlike time t11 and time t14, because both the first and second ready flags F1 and F2 are activated at time t18, the third data D3 may be copied to the first and second register groups G1 and G2. In addition, the group detector 62 may deactivate the first and second ready flags F1 and F2.

Figure 8:
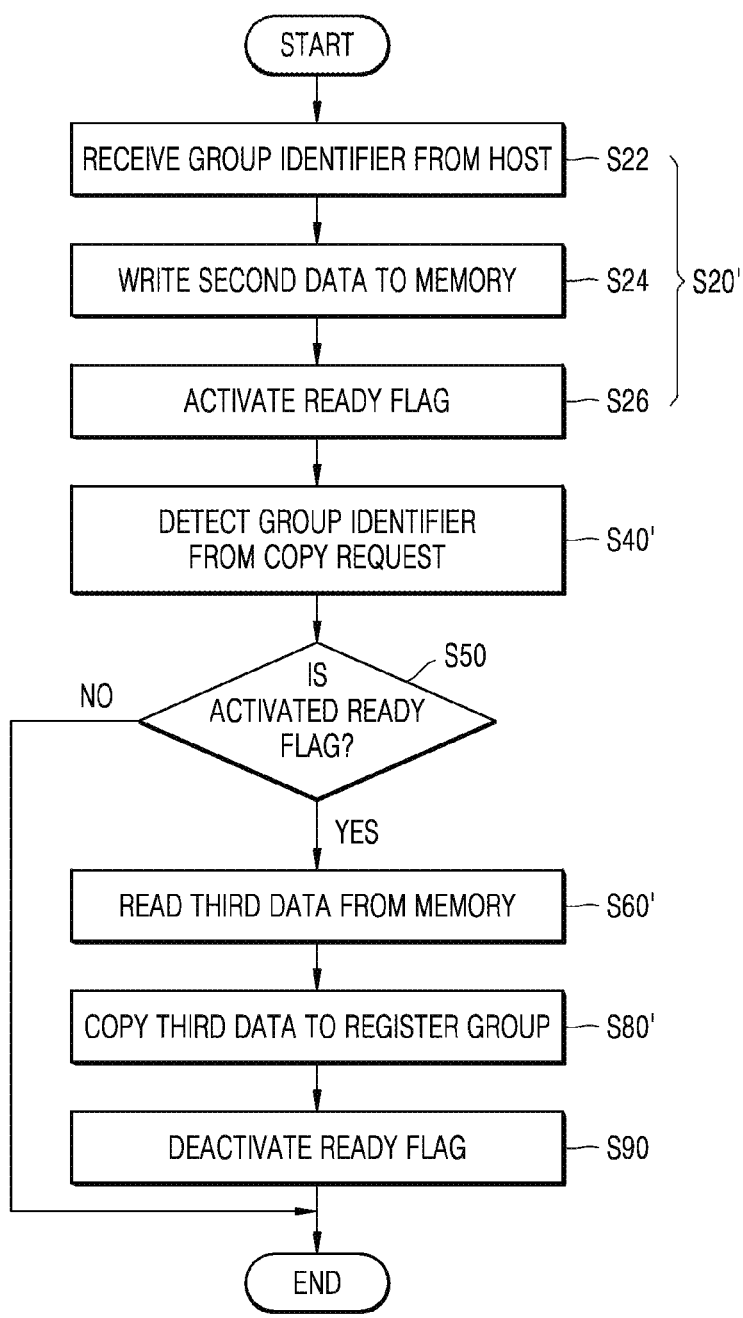
FIG. 8 is a flowchart illustrating an example of a method of managing registers, according to example embodiments.

FIG. 8 is a flowchart illustrating an example of a method of managing registers, according to example embodiments. The method of FIG. 8 may include a plurality of operations S20', S40', S60', and/or S80' similar to the method of FIG. 2, and may further include operations S50 and/or S90. Hereinafter, FIG. 8 will be described with reference to FIG. 1, and a description of FIG. 8 that is the same or substantially the same as the description of FIG. 2 will be omitted.

In operation S20', as described above with reference to FIG. 2, an operation of storing the second data D2 in the memory 15 may be performed. Operation S20' may include a plurality of operations S22, S24, and/or S26, and in some example embodiments, may be performed by the register manager 60 of FIG. 6.

In operation S22, an operation of receiving a group identifier from the host 11 may be performed. For example, the register manager 13 may receive not only the second data D2 but also a group identifier (e.g., ID_H in FIG. 6) indicating a register group corresponding to the second data D2 from the host 11.

In operation S24, an operation of writing the second data D2 to the memory 15 may be performed. For example, the register manager 13 may obtain an address corresponding to the group identifier received in operation S22, and may write the second data D2 in an area of the memory 15 corresponding to the obtained address.

In operation S26, an operation of activating a ready flag may be performed. For example, after writing of the second data D2 to the memory 15 is completed, the register manager 13 may activate a ready flag corresponding to a group identifier (e.g., a second group identifier) received from a host from among ready flags.

Figure 9:
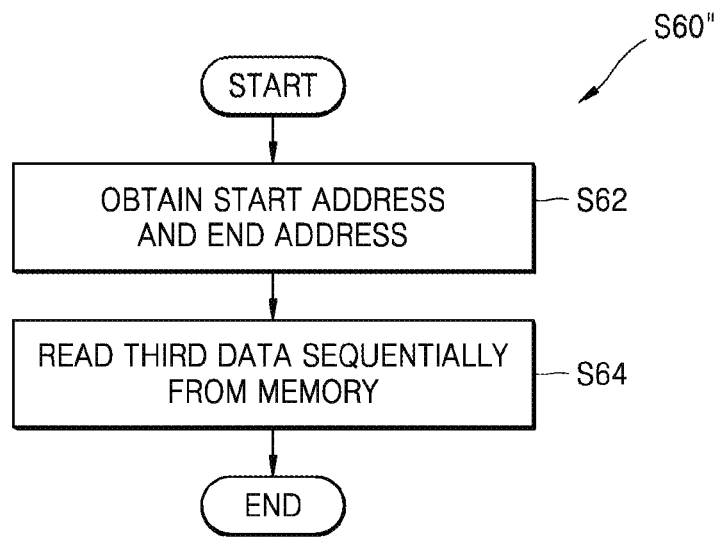
FIG. 9 is a flowchart illustrating an example of a method of managing registers, according to example embodiments.

Following operation S20', in operation S40', an operation of detecting a group identifier from the copy request REQ may be performed. Next, in operation S50, an operation of determining whether the ready flag is in an active state may be performed. For example, the register manager 13 may determine whether a ready flag corresponding to the group identifier detected from the copy request REQ is activated. As shown in FIG. 9, when the ready flag is in an active state, operation S60' may be subsequently performed, but when the ready flag is in an inactive state, the method of FIG. 8 may be terminated. When a plurality of group identifiers are detected in operation S40', different from that shown in FIG. 8, operation S50 may be repeatedly performed for the plurality of group identifiers.

In operation S60', an operation of reading third data from the memory 15 may be performed. Next, in operation S80', an operation of copying the third data D3 to the register group may be performed. The plurality of processing circuits 19 may read the first data D1 from the register block 17 and may perform an operation based on the first data D1.

In operation S90, an operation of deactivating the ready flag may be performed. For example, after the copying of the third data D3 is completed, a register manager 63 may deactivate the ready flag corresponding to the group identifier (e.g., a first group identifier) detected from the copy request REQ.

FIG. 9 is a flowchart illustrating an example of a method of managing registers, according to example embodiments. In more detail, the flowchart of FIG. 9 shows an example of operation S60 of FIG. 2 and operation S60' of FIG. 8. As described above with reference to FIGS. 2 and 8, an operation of reading the third data D3 from the memory in operation S60" of FIG. 9 may be performed. As shown in FIG. 9, operation S60" may include operations S62 and S64. In some example embodiments, operation S60" of FIG. 9 may be performed by the register manager 43 of FIG. 4, and FIG. 9 will be described below with reference to FIG. 4.

In operation S62, an operation of obtaining a start address and an end address may be performed. For example, the group detector 43_2 of the register manager 43 may provide the group identifier ID detected from the copy request REQ to the address generator 43_4, and the address generator 43_4 may obtain a start address and an end address that define an area of the memory 45 corresponding to the group identifier ID.

In operation S64, an operation of reading the third data D3 from the memory 45 may be performed. In some example embodiments, the address generator 43_4 may provide the address ADR sequentially increasing from the start address obtained in operation S62 to the end address to the memory controller 43_6. In some example embodiments, the address generator 43_4 may provide the address ADR sequentially decreasing from the end address obtained in operation S62 to the start address to the memory controller 43_6. The memory controller 43_6 may sequentially read the third data D3 from the memory 45 according to the address ADR provided from the address generator 43_4.

Figure 10:
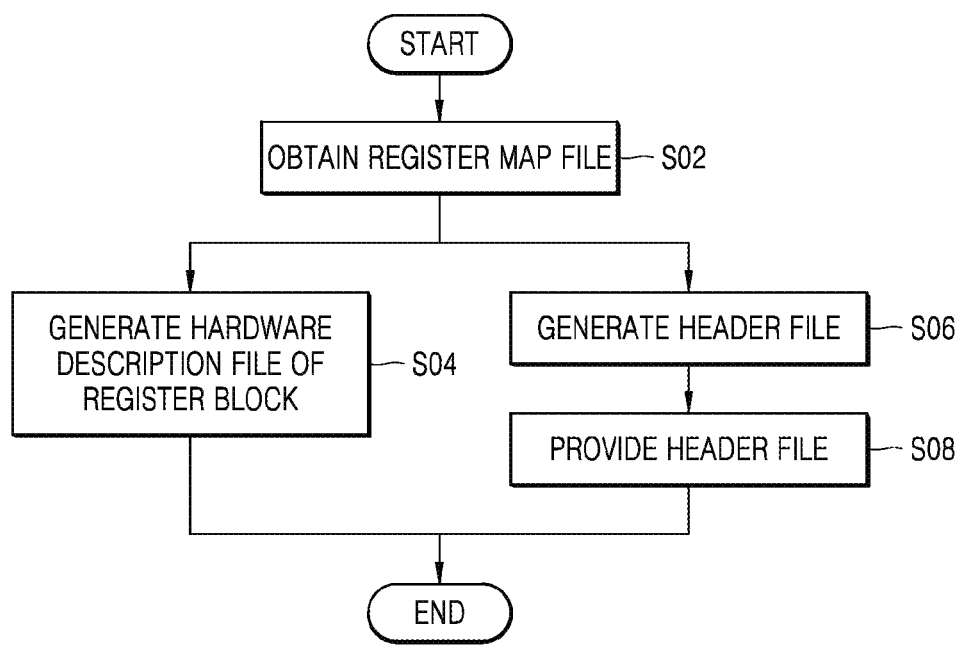
FIG. 10 is a flowchart illustrating a method of managing registers, according to example embodiments.

FIG. 10 is a flowchart illustrating a method of managing registers, according to example embodiments. In more detail, the flowchart of FIG. 10 shows an example of a method of designing a register block and a register manager. As shown in FIG. 10, the method of designing the register block and the register manager may include a plurality of operations S02, S04, S06, and/or S08.

Referring to FIG. 10, in operation S02, an operation of obtaining a register map file may be performed. The register map file may define a plurality of register groups included in the register block, and may define registers included in each of the plurality of register groups. In some example embodiments, the register map file may be created as a table by a designer. The register map file may have any type such as a spreadsheet, and an example of the register map file will be described later with reference to FIG. 11. As shown in FIG. 10, operations S04 and S06 may be performed following operation S02.

In operation S04, an operation of generating a hardware description file of the register block may be performed. The hardware description file may refer to data defining the register block in an RTL. For example, a hardware description file written in a hardware description language may be generated based on the register map file. Accordingly, the hardware description file generated in operation S04 may define registers included in the register block and may define an interface for accessing the registers.

In operation S06, an operation of generating a header file may be performed. The header file may be written in a hardware description language, and may include addresses corresponding to register groups, respectively, defined in the register map file. An example of the header file will be described later with reference to FIG. 12.

In operation S08, an operation of providing the header file may be performed. For example, the header file may be provided to be included in a hardware description file defining the register manager. The designer may create the hardware description file that defines the register manager using names of the register groups defined in the register map file, and the created hardware description file may be created to include a directive such as "include" in order to refer to the header file provided in operation S08. Accordingly, even when a configuration of the register groups is changed due to, for example, a change in a scenario defined by RAT, the designer may modify only the register map file instead of modifying the hardware description file of the register manager, and may consequently limit the occurrence of errors in register blocks and register managers even in the changed scenarios.

In some example embodiments, the method of FIG. 10 may be defined by a program including a series of instructions. For example, the method of FIG. 10 may be performed by a computing system including at least one processor that executes a series of instructions by accessing a memory storing the program, and the computing system may include portable computing systems such as laptop computers and the like as well as stationary computing systems such as desktop computers, servers, and the like.

Figure 11:
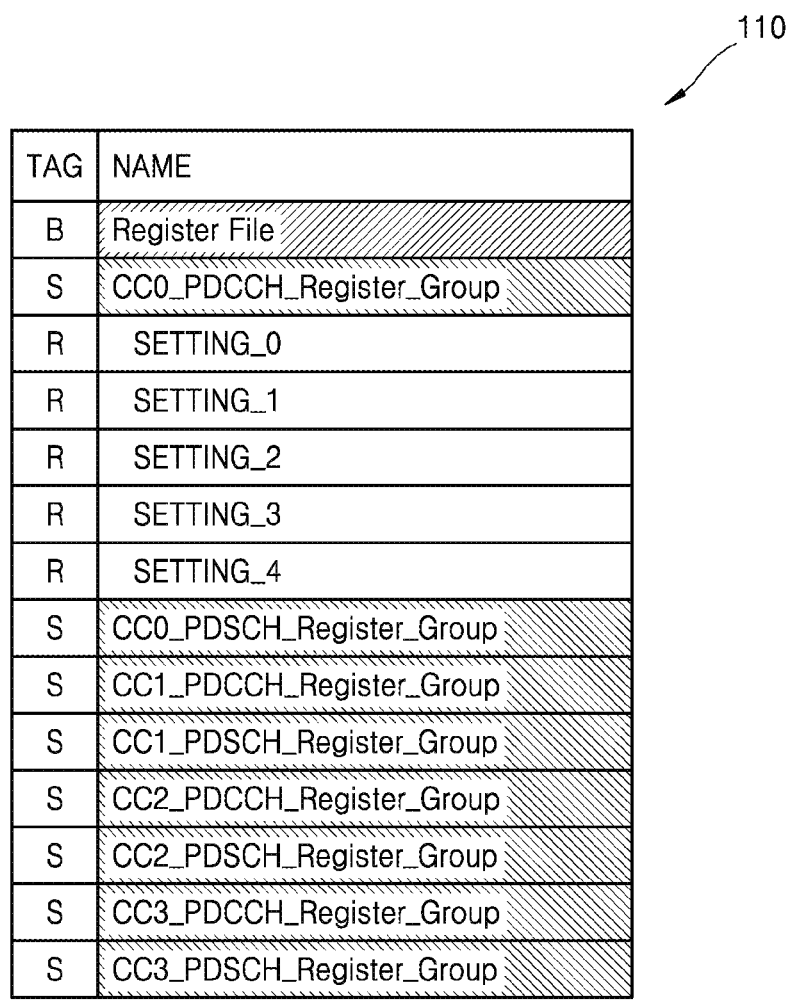
FIG. 11 illustrates an example of a register map file according to example embodiments.

FIG. 11 illustrates an example of a register map file 110 according to example embodiments, and FIG. 12 illustrates an example of a header file 120 according to example embodiments. As described above with reference to FIG. 10, the header file 120 of FIG. 12 may be generated from the register map file 110 of FIG. 11.

Referring to FIG. 11, the register map file 110 may define a plurality of register groups. For example, as shown in FIG. 11, the register map file 110 may define eight register groups marked with a tag "S". In addition, the register map file 110 may define registers included in a register group, for example, as shown in FIG. 11, four registers included in a register group CC0_PDCCH and marked with a tag "R". FIG. 11 shows only the registers included in the register group CC0_PDCCH. However, by expanding another register group, registers included in the corresponding register group may be displayed.

Referring to FIG. 12, the header file 120 may define a start address and an end address respectively corresponding to a plurality of register groups. For example, as shown in FIG. 12, the header file 120 may define "0x000" and "0x100" as a start address and an end address of the register group CC0_PDCCH, respectively. In addition, the header file 120 may define "0x104" and "0x1FC" as a start address and an end address of a register group CC0_PDSCH, respectively. Accordingly, the area of a memory corresponding to the register group CC0_PDSCH may be smaller than the area of a memory corresponding to the register group CC0_PDCCH.

Figure 13:
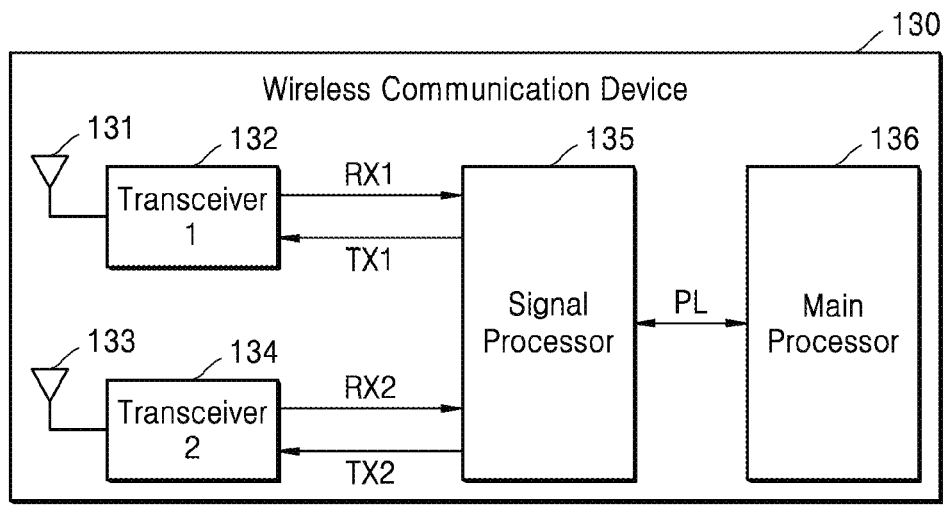
FIG. 13 is a block diagram of a wireless communication device according to example embodiments.

FIG. 13 is a block diagram of a wireless communication device 130 according to example embodiments. As shown in FIG. 13, the wireless communication device 130 may include a first antenna 131, a first transceiver 132, a second antenna 133, a second transceiver 134, a signal processor 135, and/or a main processor 136. In some example embodiments, the signal processor 135 may include the signal processing apparatus described above with reference to the drawings, and the signal processing apparatus may be used for signal processing for wireless communication.

The first transceiver 132 may provide a first receiving signal RX1 to the signal processor 135 by processing an RF signal received from the first antenna 131, and may output the RF signal to the first antenna 131 by processing a first transmitting signal TX1 provided by the signal processor 135. Similarly, the second transceiver 134 may provide a second receiving signal RX2 to the signal processor 135 by processing an RF signal received from the second antenna 133, and may output the RF signal to the second antenna 133 by processing a second transmitting signal TX2 provided from the signal processor 135. The first transceiver 132 and the second transceiver 134 may include filters, mixers, power amplifiers, low noise amplifiers, phase shifters, switches, and the like.

The signal processor 135 may generate the first and second transmitting signals TX1 and TX2 based on a payload PL received from the main processor 136, and may generate the payload PL from the first and second receiving signals RX1 and RX2 and provide them to the main processor 136. The first and second receiving signals RX1 and RX2 and the first and second transmitting signals TX1 and TX2 may be baseband signals, and the signal processor 135 may be referred to as a modem, a communication processor, a baseband processor, or the like. As shown in FIG. 13, the signal processor 135 may be connected to two or more transceivers, and thus, may process signals according to various communication parameters and scenarios.

The signal processor 135 may include the signal processing apparatus described above with reference to the drawings in order to process the first and second receiving signals RX1 and RX2 or to generate the first and second transmitting signals TX1 and TX2. For example, the signal processor 135 may include a plurality of processing circuits, a register block accessed by the plurality of processing circuits, and a register manager that manages the register block. The register block may include a plurality of register groups, and accordingly, a plurality of processing circuits may be accurately controlled so that an operation error of the signal processor 135 may be eliminated and performance may be improved. In addition, as a memory is used for register shadowing, an increase in resources of the signal processor 135 may be limited despite an increase in communication parameters.

Figure 14:
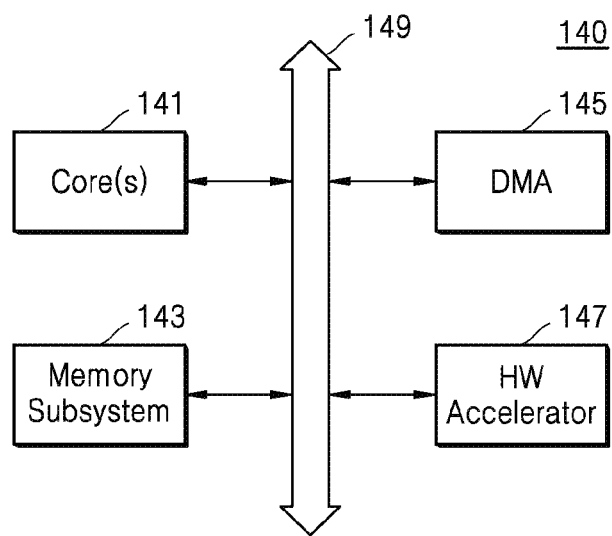
FIG. 14 is a block diagram illustrating an example of a signal processing apparatus, according to example embodiments.

FIG. 14 is a block diagram illustrating an example of a signal processing apparatus 140, according to example embodiments. As shown in FIG. 14, the signal processing apparatus 140 may include at least one core 141, a memory subsystem 143, direct memory access (DMA) 145, and/or a hardware accelerator 147. In some example embodiments, the hardware accelerator 147 may include the register block and register manager described above with reference to the drawings.

At least one core 141 may execute instructions stored in the memory subsystem 143 and may be referred to as a central processing unit (CPU). For example, by executing an instruction, at least one core 141 may instruct the hardware accelerator 147 to perform a desired operation, like the host 11 of FIG. 1.

The memory subsystem 143 may be accessed by other components of the signal processing apparatus 140 via a bus 149. The memory subsystem 143 may include volatile memory such as DRAM and SRAM, and may include nonvolatile memory such as flash memory and MRAM.

The DMA 145 may access the memory subsystem 143 through the bus 149 and control accesses of other components to the memory subsystem 143 independently of the at least one core 141. For example, the DMA 145 may read data to be processed by the hardware accelerator 147 from the memory subsystem 143 and provide the data to the hardware accelerator 147, or may provide data generated by the hardware accelerator 147 to the memory subsystem 143.

The hardware accelerator 147 may refer to a logic circuit designed to perform a specific operation at high speed. For example, the hardware accelerator 147 may include the register manager 13, the memory 15, the register block 17, and/or the plurality of processing circuits 19 of FIG. 1. As described above with reference to the drawings, the register block 17 may include a plurality of register groups, and the register manager 13 may independently manage a plurality of register groups. Accordingly, the operation reliability and/or performance of the hardware accelerator 147 may be improved, and consequently, the operation reliability and/or performance of the signal processing apparatus 140 may be improved.

Any of the elements disclosed above may include or be implemented in (one or more) processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:
1. An apparatus comprising:
a register block including a plurality of register groups;
a plurality of processing circuits connected to the register block, each respective processing circuit among the plurality of processing circuits being configured to operate based on data stored in a different register group among the plurality of register groups; and a register manager configured to,
   receive updated data from a host,
   receive a copy request for at least one register group among the plurality of register groups from at least one processing circuit among the plurality of processing circuits, and
   copy at least a portion of the updated data to the at least one register group in response to the copy request.

2. The apparatus of claim 1, further comprising a memory configured to be accessed by the register manager,
   wherein the register manager is configured to write the updated data to the memory and read the at least the portion of the updated data from the memory, based on a plurality of addresses corresponding to the plurality of register groups, respectively.

3. The apparatus of claim 2, wherein the plurality of addresses include a start address and an end address of each of the plurality of register groups.

4. The apparatus of claim 1, wherein the at least one processing circuit is configured to generate the copy request including at least one first group identifier indicating the at least one register group, and
   the register manager is configured to identify the at least the portion of the updated data based on the at least one first group identifier.

5. The apparatus of claim 4, wherein the copy request includes a plurality of bits corresponding to the plurality of register groups, respectively, and
   the at least one first group identifier corresponds to an index of at least one activated bit from among the plurality of bits.

6. The apparatus of claim 1, wherein the plurality of processing circuits comprises:
   a first processing circuit configured to provide a first copy request for a first register group from among the plurality of register groups to the register manager; and
   a second processing circuit configured to provide a second copy request for a second register group from among the plurality of register groups to the register manager.

7. The apparatus of claim 1, wherein the register manager is configured to receive at least one second group identifier corresponding to the updated data from the host, to activate at least one ready flag corresponding to the at least one second group identifier to obtain at least one activated ready flag, and to deactivate the at least one activated ready flag after copying the at least the portion of the updated data corresponding to the at least one activated ready flag to the at least one register group.

8. The apparatus of claim 1, wherein the register manager receives the updated data at a timing synchronized with a transmission time interval (TTI), and
   the plurality of processing circuits are configured to process the data based on a communication protocol.

9. The apparatus of claim 8, wherein the plurality of register groups are defined based on at least one of the plurality of processing circuits, a component carrier, a channel, or a radio frequency (RF) chain.

10. An apparatus comprising:
   a memory;
   a register block including a plurality of register groups;
   a plurality of processing circuits connected to the register block, each respective processing circuit among the plurality of processing circuits being configured to operate based on data stored in a different register block group among the plurality of register groups; and
   a register manager configured to,
      write updated data received from a host into the memory,
      read at least a portion of the updated data from the memory in response to a copy request received from at least one processing circuit among the plurality of processing circuits, and
      copy the at least the portion of the updated data to at least one register group among the plurality of register groups.

11. The apparatus of claim 10, wherein the register manager comprises:
   a group detector configured to detect at least one first group identifier from the copy request;
   an address generator configured to output a first address of the memory corresponding to the at least one first group identifier; and
   a memory controller configured to read the at least the portion of the updated data from the memory based on the first address.

12. The apparatus of claim 11, wherein the copy request includes a plurality of bits corresponding to the plurality of register groups, respectively, and
   the group detector is configured to detect the at least one first group identifier as an index of at least one activated bit from among the plurality of bits.

13. The apparatus of claim 11, wherein the address generator is configured to output a start address and an end address each corresponding to the at least one first group identifier as the first address.

14. The apparatus of claim 11, wherein the group detector is configured to receive at least one second group identifier from the host together with the updated data,
   the address generator is configured to output a second address of the memory corresponding to the at least one second group identifier, and
   the memory controller is configured to write the updated data to the memory based on the second address.

15. The apparatus of claim 14, further comprising a plurality of ready flags corresponding to the plurality of register groups, respectively,
   wherein the group detector is configured to activate at least one ready flag corresponding to the at least one second group identifier, and to provide the at least one first group identifier to the address generator when at least one ready flag corresponding to the at least one first group identifier is activated.

16. The apparatus of claim 15, wherein the group detector is configured to deactivate the at least one ready flag corresponding to the at least one first group identifier after providing the at least one first group identifier to the address generator.

17. A method of managing a register block referenced by a plurality of processing circuits, the method comprising:
   storing data received from a host in a memory;
   detecting at least one first group identifier from a copy request received from at least one processing circuit among the plurality of processing circuits;
   reading the data from the memory based on the at least one first group identifier to obtain read data; and
   copying the read data to a first register group corresponding to the at least one first group identifier, the first register group being among a plurality of register groups included in the register block, and each respective processing circuit among the plurality of processing circuits being configured to operate based on data stored in a different register group among the plurality of register groups.

18. The method of claim 17, wherein the reading of the data from the memory comprises:
obtaining a start address and an end address of the memory each corresponding to the at least one first group identifier; and
sequentially reading the data from an area of the memory corresponding to the start address and the end address.

19. The method of claim 17, further comprising receiving at least one second group identifier from the host,
wherein the storing of the data received from the host in the memory comprises:
obtaining a start address and an end address of the memory each corresponding to the at least one second group identifier; and
writing the data received from the host into an area of the memory corresponding to the start address and the end address.

20. The method of claim 19, wherein the storing of the data received from the host in the memory further comprises: activating at least one ready flag corresponding to the at least one second group identifier,
wherein the reading of the data from the memory is performed when a ready flag corresponding to the at least one first group identifier is activated, and
the method further comprises deactivating the ready flag corresponding to the at least one first group identifier after performing the reading of the data from the memory.

\* \* \* \* \*